(12) United States Patent
Ratner et al.

(10) Patent No.: US 7,133,564 B2
(45) Date of Patent: Nov. 7, 2006

(54) DYNAMIC CHAIN-BASED THRESHOLDING USING GLOBAL CHARACTERISTICS

(75) Inventors: Edward Ratner, Sunnyvale, CA (US); Adityo Prakash, Redwood Shores, CA (US); Hitoshi Watanabe, San Jose, CA (US); Sachin Ahuja, Mountain View, CA (US)

(73) Assignee: Altera Corporation, San Jose, CA (US)

( * ) Notice: Subject to any disclaimer, the term of this patent is extended or adjusted under 35 U.S.C. 154(b) by 903 days.

(21) Appl. No.: 10/087,001

(22) Filed: Feb. 28, 2002

(65) Prior Publication Data

US 2002/0159638 A1 Oct. 31, 2002

Related U.S. Application Data

(60) Provisional application No. 60/272,332, filed on Feb. 28, 2001.

(51) Int. Cl.
G06K 9/36 (2006.01)
G06K 9/48 (2006.01)

(52) U.S. Cl. ...................... 382/242; 382/199
(58) Field of Classification Search ................. 382/242
See application file for complete search history.

(56) References Cited

U.S. PATENT DOCUMENTS 5,835,237 A * 11/1998 Ebrahimi .................... 358/448
5,978,513 A * 11/1999 Murayama .................. 382/242
6,002,794 A * 12/1999 Bonneau et al. ............ 382/166
6,094,508 A * 7/2000 Acharya et al. ............ 382/199

FOREIGN PATENT DOCUMENTS

WO WO 00/77735 A1 12/2000

OTHER PUBLICATIONS

"Color Image Segmentation Using Modified HSI System for Road Following". Lin, Xueyin and Shaoyun Chen. Proceedings of the 1991 IEEE International Conference on Robotics and Automation. Apr. 1991.*
"A Comparative Study on Color Edge Detection". Koschan, Andreaas. Proceedings 2nd Asian Conference on Computer Vision ACCV'95. Dec. 1995. vol. III. pp. 574-578.*
A.D. Brink, "Edge-Based Dynamic Tresholding Of Digital Images" XP000926357, IEEE 1991, p. 63; Dept. of Computational and Applied Mathematics, Johannesburg.

(Continued)

*Primary Examiner*—Joseph Mancuso
*Assistant Examiner*—Damon Conover
(74) *Attorney, Agent, or Firm*—Okamoto & Benedicto LLP

(57) ABSTRACT

One embodiment relates to an apparatus for image processing. The apparatus includes a candidate edge chain identifier for identifying candidate edge chains in an image being processed, means for calculating a dynamic chain-based threshold function that is dependent on at least one characteristic of the image being processed, and a threshold applicator for applying the dynamic chain-based threshold function to the candidate edge chains. The characteristic of the image being processed may be global in that it is determined from the overall image being processed. A system may include an encoder or a decoder, both of which include the above apparatus. Another embodiment relates to a method for image processing. The method determines a dynamic chain-based threshold function that is dependent on at least one characteristic of the image being processed and applies the dynamic threshold to a candidate edge chain.

15 Claims, 5 Drawing Sheets

OTHER PUBLICATIONS

Wei Lei, et al. "Segmentation Based Coding Of Motion Compensated Prediction Error Images" XP000926358, Apr. 30, 1993, pp. 357-360, vol. 5; Signal Processing Laboratory, Switzerland.

"Canny edge detector demos" [on-line], [retrieved on Feb. 14, 2002] Retrived from the internet: URL:http://robotics.eecs.berkeley.edu/sastry/ee20/cademo.html.

Charlie Rothwell, et al. "Driving Vision by Topology" Dec. 1994, pp. 1-29, INRIA Sophia Antipolis, France.

Adityo Prakash, et al. "Method and Apparatus For Efficient Video Processing" U.S. Patent Appl. No. 09/550,705 filed Apr. 17, 2000.

Adityo Prakash, et al. "Dynamic Thresholding" U.S. Appl. No. 60/272,332 filed Feb. 28, 2001.

"Classical Feature Detector" [on-line] [retrieved on Feb. 16, 2002] Retrieved from the Internet: URL:http://www.dai.ed.ac.uk/CVonline/local_copies/owens/lect6/node2.html.

* cited by examiner

DYNAMIC CHAIN-BASED THRESHOLDING USING GLOBAL CHARACTERISTICS

CROSS-REFERENCES TO RELATED APPLICATIONS

This patent application claims the benefit of co-pending Provisional Application No. 60/272,332, filed Feb. 28, 2001, and entitled "Dynamic Thresholding," the disclosure of which is incorporated herein by reference. This patent application is related to U.S. patent application Ser. No. 09/550,705, filed Apr. 17, 2000 and entitled "Method and Apparatus for Efficient Video Processing," the disclosure of which is incorporated herein by reference. This invention is related to U.S. patent application Ser. No. 09/591,438, filed Jun. 9, 2000 and entitled "Method and Apparatus for Digital Image Segmentation," the disclosure of which is incorporated herein by reference.

FIELD OF THE INVENTION

The present invention relates in general to image processing. More particularly, it may be used in relation to, for example, segment- or object-based image processing.

BACKGROUND OF THE INVENTION

It is often desirable to identify and delineate segments of an image. Image segmentation is the process of partitioning an image into a set of non-overlapping parts, or segments, that together constitute the entire image. For example, the segmentation may divide the image into a background segment and a plurality of foreground segments. A foreground segment may, for example, correspond to an object, or a part of an object, in the image. Digital image or video processing may be facilitated by image segmentation.

In order to identify and delineate the segments in an image, the boundaries or edges of the segments may be detected or extracted. Extracting those edges or boundaries between segments using an electronically-implementable edge-detection algorithm or routine is difficult to do accurately for a general case. Such an algorithm must work for a wide range of images with varying amounts of scales and details. To be suitable for applications requiring fully-automated segmentation, the algorithm should not require user guidance or prior knowledge of the image to be segmented.

One technique for edge extraction is referred to as Canny edge detection. The process of conventional Canny edge detection begins with smoothing of intensity values by convolution with a two-dimensional Gaussian function. The smoothed image data is then differentiated to calculate a gradient vector function indicating the rate and direction of intensity change at each point in the image. Then, a non-maxima suppression process determines candidate edge points by eliminating non-maxima points perpendicular to edge directions. Subsequently, point-based thresholding is applied to the candidate edge points. In Canny edge detection, the point-based thresholding uses a hysteresis-type (two level) threshold function. Hysteresis-type threshold function evaluates the non-maxima points using two threshold levels. If a gradient value at a point lies above the upper threshold level, then the point is automatically accepted. If the gradient value lies below the lower threshold level, then the point is automatically rejected. If the gradient value lies in between the upper and lower thresholds, then the point is accepted if it is connected to a high value point. In other words, a chain does not stop until a point is reached that has a gradient value below the lower threshold.

Despite the accomplishments of prior edge extraction techniques, problems remain to be overcome in order to improve the edge extraction. One problem to be overcome to improve edge extraction is the over-identification of edges (i.e., the extraction of too many edges). For example, consider one white shirt on a black background. It may be desired to identify the white shirt as an image segment with a single edge around its boundary separating it from the black background segment. However, folds in the shirt may produce shadowed areas that may cause additional edges to be generated by the edge-detection routine. These extraneous edges may result in the creation of additional segments within the otherwise plain white shirt, or they may be superfluous in that they cannot be connected to enclose a segment.

SUMMARY OF THE INVENTION

One embodiment relates to an apparatus for image processing. The apparatus includes a candidate edge chain identifier for identifying candidate edge chains in an image being processed, means for calculating a dynamic chain-based threshold function that is dependent on at least one characteristic of the image being processed, and a threshold applicator for applying the dynamic chain-based threshold function to the candidate edge chains. The characteristic of the image being processed may be global in that it is determined from the overall image being processed.

A system may include an encoder or a decoder, both of which include the above apparatus. Another embodiment relates to a method for image processing. The method determines a dynamic chain-based threshold function that is dependent on at least one characteristic of the image being processed and applies the dynamic threshold to a candidate edge chain.

DESCRIPTION OF THE SPECIFIC EMBODIMENTS

One technique for dealing with the over-identification of edges relates to applying chain-based thresholding to the candidate edge chains. As the terminology is used in the present specification, chain-based thresholding differs from point-based thresholding. In point-based thresholding, a threshold function is applied to a point. In chain-based thresholding, a threshold function is applied to a chain of points. Chain-based thresholding finds undesired or extraneous chains so that they may be eliminated from consideration. Candidate edge chains that do not meet the threshold requirements (i.e., that do not pass the threshold function) would be removed from the set of identified edge chains. For example, those candidate edge chains that are particularly short may not pass the threshold function and so may be removed as extraneous.

Previous known techniques have used static threshold functions for chain-based thresholding. However, such static threshold functions may categorize too many or too few chains as extraneous chains, depending on the threshold chosen and the particular image being processed. In other words, a static threshold function for chain-based thresholding is likely to have difficulty working well across a wide range of images.

The present patent application describes the advantageous improvement of using automatic dynamic threshold functions for chain-based thresholding. Such dynamic threshold functions are dependent upon characteristics of the image being processed. In contrast, static threshold functions do not take into account characteristics of a given image. Alternatively, the thresholds may be selected by the human user for a particular image. In other words, dynamic chain-based thresholding automatically determines whether or not to retain a candidate edge chain depending, not only upon the characteristics of the chain in question, but also upon characteristics of the image in which the chain resides.

In accordance with one embodiment of the invention, the chain-based thresholding may be dependent on one or more dynamic globally-measured characteristics of the image. The dynamic globally-measured characteristic is one that is measured over an entire image frame or over substantially all of the image frame. For example, the dynamic globally-measured characteristic may be a measure of color variation in the image frame. The measure may be, for example, a mean or a median of color variation in the frame.

In accordance with another embodiment of the invention, the chain-based thresholding may be dependent on one or more dynamic locally-scaled characteristics of the image. For example, the dynamic locally-scaled characteristic may be measured within a local neighborhood around points in the chain being thresholded. The characteristic may be, for example, related to the chain strength, and the local scaling may depend on the local extrema strength or density surrounding each point in the chain.

Figure 1:
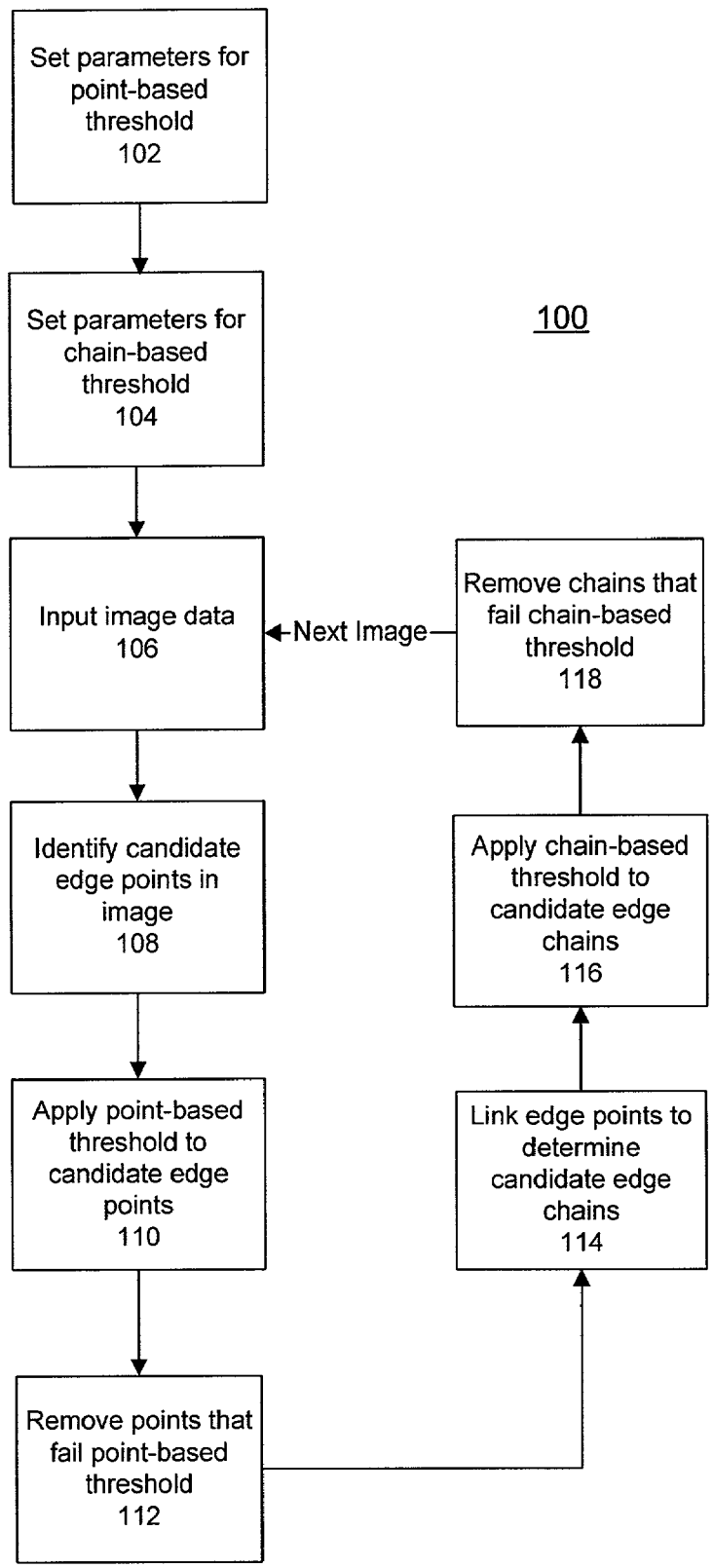
FIG. 1 is a flow chart depicting a conventional edge-detection process.

FIG. 1 is a flow chart depicting a conventional edge-detection process. The process 100 as depicted includes nine steps that are described below.

In a first step 102, parameters are set for a point-based threshold function. For example, the point-based threshold function may be a single-level threshold or a hysteresis-type threshold. In the case of a hysteresis-type threshold, the parameters that are set may include values for the upper and lower threshold levels. Typically, the upper threshold level may be set to be two to three times the lower threshold level. In a second step 104, parameters are set for a chain-based threshold function. For example, the chain-based threshold function may be set to eliminate chains less than n points in length and/or be set to eliminate chains where the sum of the gradient values of its maxima is less than a certain threshold. In this conventional process 100 depicted in FIG. 1, both the first and second steps 102 and 104 need only be performed once and may be done long before the other steps. This is because the point-based and chain-based threshold functions are both static threshold functions. Static threshold functions do not change from image to image. In other words, a static threshold function is independent of the image characteristics.

In a third step 106, the processing of an image begins by input of the image data. The image data typically comprises pixel color values. Pixel color values can be selected from any number of pixel color spaces. One color space in common use is known as the YUV color space, wherein a pixel color value is described by the triple (Y, U, V), where the Y component refers to a grayscale intensity or luminance, and U and V refer to two chrominance components. The YUV color space is commonly seen in television applications. Another common color space is referred to as the RGB color space, wherein R, G and B refer to the Red, Green and Blue color components, respectively. The RGB color space is commonly seen in computer graphics representations, along with CYMB (cyan, yellow, magenta and black) often used with computer printers.

In a fourth step 108, candidate edge points (also called "edgels") in the image are identified. This may be accomplished using various methods, such as gradient-type methods and second-order methods. For example, as described above, the Canny edge detection method identifies candidate edge points uses a gradient-type method and non-maxima suppression. In a fifth step 110, a point-based threshold may be applied to the candidate edge points. For example, the point-based threshold may be a single-level threshold or a hysteresis-type threshold. The Canny edge detection method uses a hysteresis-type threshold. In a sixth step 112, the candidate edge points that do not pass the point-based threshold are removed from the set of edge points.

In a seventh step 114, those edge points that passed the point-based threshold are linked to form candidate edge chains. This step involves grouping together edge points to form the edge chains. The linking may be accomplished, for example, by considering each edge point's relationship to neighboring edge points (local edge linking) or by consider all the edge points at once and grouping those edge points that match a similarity constraint such as sharing a same edge equation (global edge linking). In an eighth step 116, a chain-based threshold may be applied to the candidate edge chains. For example, the chain-based threshold may be a single-level threshold based upon a chain's length. In a ninth step 118, the candidate edge chains that do not pass the chain-based threshold are removed from the set of edge chains. The result is the set of edge chains detected by the edge-detection process 100 for that image. After the ninth step 118, the process 100 loops back to the third step 106 and image data is input for a next image.

Figure 2:
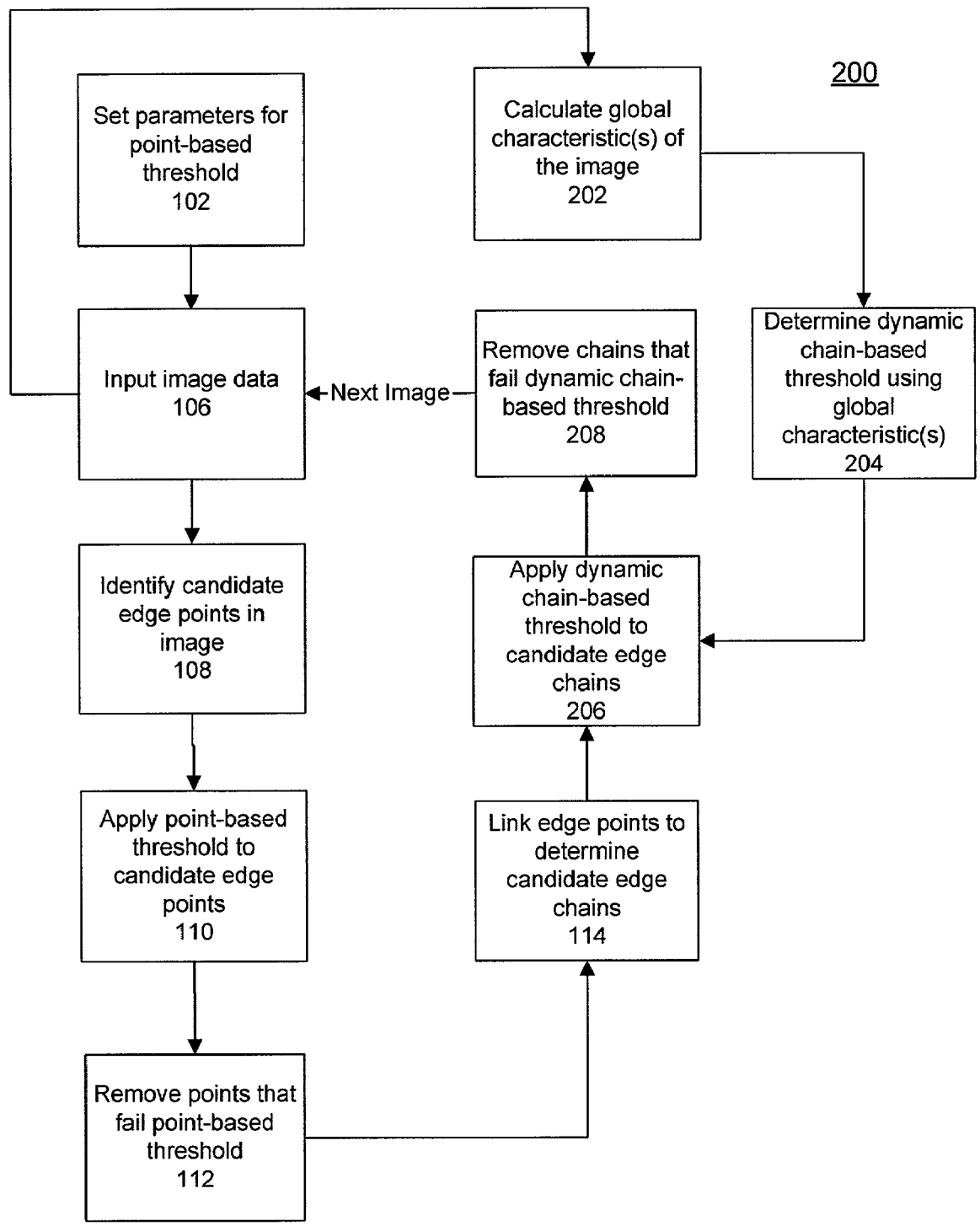
FIG. 2 is a flow chart depicting an edge-detection process using dynamic chain-based thresholding dependent on global characteristics of an image in accordance with an embodiment of the invention.

FIG. 2 is a flow chart depicting an edge-detection process using dynamic chain-based thresholding dependent on one or more global characteristics of an image in accordance with an embodiment of the invention. A globally-measured characteristic is one that is measured over an entire image frame or over substantially all of the image frame. The process 200 as depicted includes ten steps that are described below.

The first step 102 may be the same as in the conventional process 100. In this step 102, the parameters are set for a point-based threshold function. For example, the point-based threshold function may be a single-level threshold or a hysteresis-type threshold. However, the second step 104 from the conventional process 100 may be missing from this process 200. This is because the chain-based threshold function is dynamically determined based on one or more characteristic(s) of the image being processed, and so parameters for the chain-based threshold function cannot yet be set in this process 200.

The second 106, third 108, fourth 110, fifth 112, and sixth 114 steps in this process 200 may be the same as or similar to the corresponding steps (106, 108, 110, 112, and 114) in the conventional process 100. These steps involve inputting the image data (step 106), identifying candidate edge points in the image (step 108), applying the point-based threshold to the candidate edge points (step 110), removing those points that do not pass the point-based threshold (step 112), and linking the edge points to determine candidate edge chains (step 114).

The other steps (202, 204, 206, and 208) in this process 200 are distinctive from the conventional process 100. These steps relate to the determination and application of a dynamic chain-based threshold that is dependent on one or more global characteristics of the image being processed.

In the first distinctive step 202, a calculation is made of one or more globally-measured characteristic(s) of the image being processed. This step 202 can be done subsequent to the image data input step 106. In accordance with one embodiment of the invention, a globally-measured characteristic may be a measure of color variation in the image frame. The measure may be, for example, a mean or a median of color variation in the frame.

Color in an image may be represented for each pixel by the pixel's color values. In a monochromatic image, the pixel color value can be represented by a single number. More commonly, in polychromatic color images, a pixel's color value comprises three or four color components and the color value in a polychromatic color image can be thought of as a vector in a "color space" having as many dimensions as there are components to the color values. For example, the color values of an image might be representable as vectors in the YUV space. In the YUV color space, the Y component represents luminance, or intensity, and the U and V components represent chrominance. Typically, the Y component is often of greater magnitude than the U or V components.

In accordance with embodiments of the present invention, the variation of each color component may be calculated globally over pixels, or edge points, or edge chains in a frame. The calculation may be of a mean or median value of the variation of the color component. The component variations may then be combined (by summation of squares) into a single global color variation mean or median value. The combination may weight the components differently. For example, in YUV space, the U and V components may be weighted more heavily (for example, four times more) than the Y component, in order to more strongly represent the contributions of the U and V components.

In the second distinctive step 204, the dynamic chain-based threshold is determined using the one or more global characteristic(s) calculated in the first distinctive step 202. In one embodiment, a frame-wide histogram of chain strengths is determined, where the chain strength is an integrated intensity (integration of gradient values) over edge points comprising the chain. The dynamic chain-based threshold may then be chosen as a percentage point on the histogram such that a percentage of the chains are below the threshold. The dynamic chain-based threshold may, for example, be linearly related to the measure of global color variation; for example, a fraction "a" of the measure of global color variation, where $0 \leq a < 1$ ("a" is greater than zero and less than or equal to one). Hence, the lower the global color variation, the more significant chain strength measures become, and so a lower threshold results. On the other hand, the higher the global color variation the less significant chain strength measures become, and so a higher threshold results. Of course, other dependencies of the dynamic chain-based threshold on the global characteristic(s) may also be used.

In the third distinctive step 206, the dynamic chain-based threshold from the second distinctive step 204 is applied to the candidate edge chains. Note that this step 206 is dependent not only on the linking step 114, but also on the dynamic threshold determination step 204. In one example, the dynamic chain-based threshold may be a threshold based upon a chain's strength, where the threshold strength may depend on the calculated global characteristic(s) as described above. Chains of strength at or above the threshold strength may pass, while those of strength below the threshold strength may fail.

Of course, besides a chain's strength, other features of a chain may be used as the basis for determination and application of a dynamic chain-based threshold. For example, a chain's length may be used, instead of a chain's strength.

In the fourth distinctive step 208, those candidate edge chains are removed from the set of edge chains that do not pass the dynamic chain-based threshold applied in the third distinctive step 206. The result is the set of edge chains detected by this edge-detection process 200 for that image. After that step 208, the process 200 loops back to step 106 and image data is input for a next image.

Figure 3:
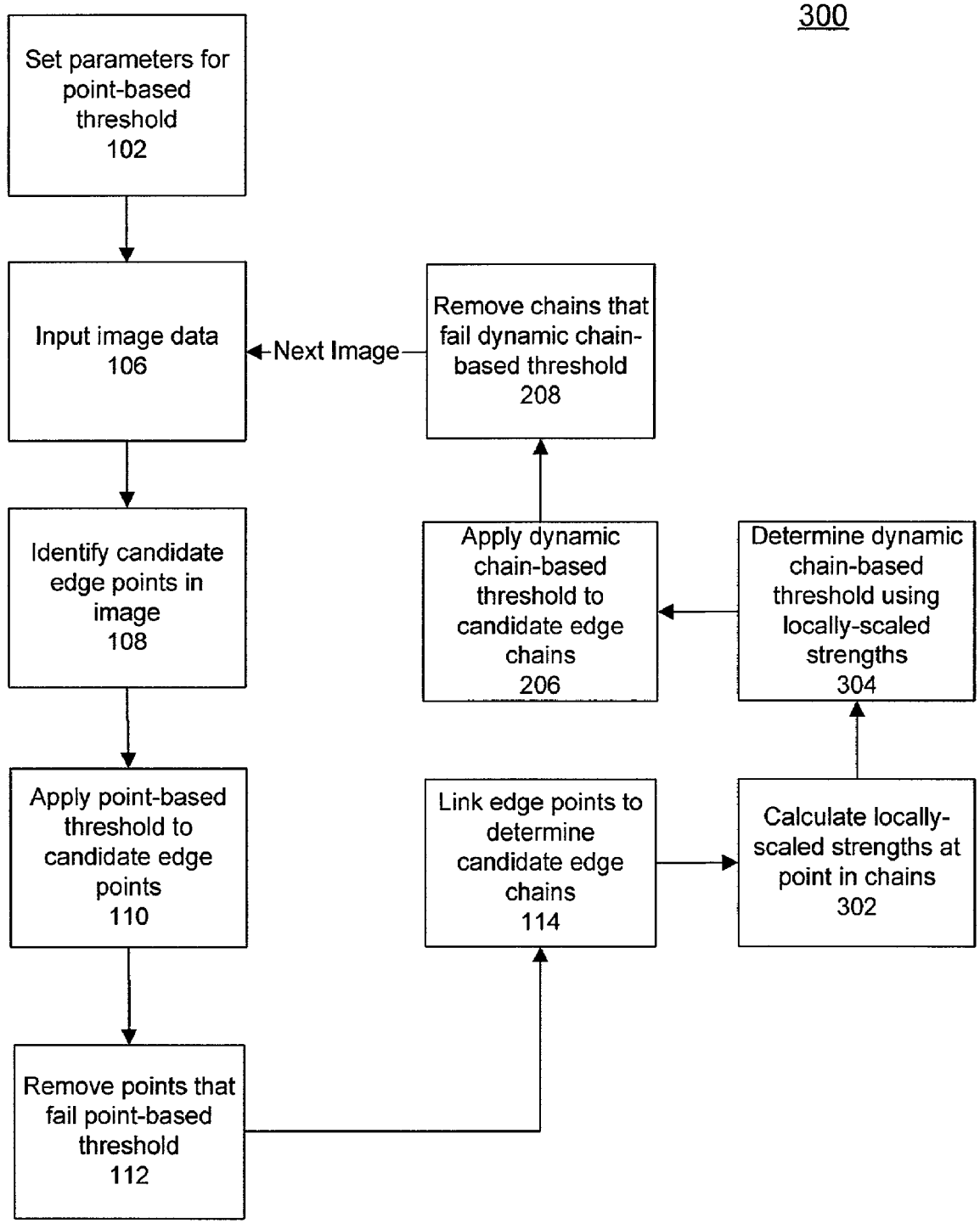
FIG. 3 is a flow chart depicting an edge-detection process using dynamic chain-based thresholding dependent on local characteristics of an image in accordance with an embodiment of the invention.

FIG. 3 is a flow chart depicting an edge-detection process using dynamic chain-based thresholding dependent on one or more locally-measured characteristic(s) of an image in accordance with an embodiment of the invention. A locally-measured characteristic may be a characteristic that is measured within a local vicinity of edge points in the chain being thresholded.

The first step 102 may be the same as in the conventional process 100. In this step 102, the parameters are set for a point-based threshold function. For example, the point-based threshold function may be a single-level threshold or a hysteresis-type threshold. However, similarly as for the second process 200, the second step 104 from the conventional process 100 may be missing from this third process 300. This is because the chain-based threshold function is dynamically determined based on one or more characteristic(s) of the image being processed, and so parameters for the chain-based threshold function cannot yet be set in this process 300.

Similarly as for the second process 200, the second 106, third 108, fourth 110, fifth 112, and sixth 114 steps in this third process 300 may be the same as or similar to the corresponding steps (106, 108, 110, 112, and 114) in the conventional process 100. These steps involve inputting the image data (step 106), identifying candidate edge points in the image (step 108), applying the point-based threshold to the candidate edge points (step 110), removing those points that do not pass the point-based threshold (step 112), and linking the edge points to determine candidate edge chains (step 114).

The next two steps (302 and 304) in this process 300 are distinctive from the conventional process 100. These steps relate to the determination and application of a dynamic chain-based threshold that is dependent on one or more local characteristics around points in the edge chain being considered.

In the first distinctive step 302, a calculation is made of one or more locally-scaled characteristic(s) of the chain being considered. This calculation step 304 may be done on a per chain basis and may depend on the local environment around the points in the chain. In one embodiment, the locally-scaled characteristic may be the chain strength. For example, a gradient value at each edge point in the chain may be scaled based on the strength and/or density of local extrema in the vicinity of the point. In one specific embodiment, a neighborhood within a 15-pixel radius of an edge point is considered, though larger or smaller neighborhoods of varying shapes may also be considered.

The greater the strength and/or density around an edge point, the less significant or important that edge point becomes, and so the more scaled down the value at the edge point becomes. In particular, a first point at one end of a chain may be surrounded with a higher extrema strength and/or density than a second point at another end of the chain is. In that case, the gradient value at the first point would be more substantially scaled down (and hence reduced in significance) in comparison to the gradient value at the second point.

In one specific embodiment, the scaling function "F" for point "i" may be in accordance with Equation 1. Equation 1 breaks down the scaling function into two factors. The first factor, $F1(i)$, is related to local intensity (strength), and the second factor $F2(i)$ is related to local density. The local intensity refers to the intensity of the extrema (either extrema points or chains) in (weighted) color intensity within the neighborhood. The local density refers to the density of the extrema (either extrema points or chains. Specific implementations of $F1(i)$ and $F2(i)$ are given below as examples. The specific values in the equations below have been empirically chosen to obtain favorable visual results. Of course, other specific values may be used.

$$F(i)=F1(i)\times F2(i) \quad \text{(Eqn. 1)}$$

$$F1(i)=\exp[2.5(m_i/m_{loc}-1.0)], \text{ if } m_i/m_{loc}>1 \quad \text{(Eqn. 2A)}$$

$$F1(i)=m_i/m_{loc}, \text{ if } m_i/m_{loc}1 \quad \text{(Eqn. 2B)}$$

$$F2(i)=(2/\pi)\arctan[-fw(\rho-\rho_o)]+1,$$

$$\text{where } \rho=\rho_i/\rho_g, \text{ and } \rho_o=0.02\times 2.2^{(2-s)} \quad \text{(Eqn. 3)}$$

In Equations 2A and 2B, $m_i$ is the intensity of the edge pixel at location "i", and $m_{loc}$ is the local average intensity around location i. In effect, the value of $F1(i)$ scales up exponentially for higher intensities ($m_i/m_{loc}>1$) and scales down linearly for lower intensities ($m_i/m_{loc}<1$).

In Equation 3, $\rho_i$ is the local density at location i, and $\rho_g$ is the global extrema density. The global density refers to the density of extrema (either extrema points or chains) in color intensities within the image as a whole. The variable $\rho_0$ represents the critical density and may be visually and empirically determined. As indicated by Equation 3, when $\rho<\rho_0$, $F2(i)>1$ and otherwise $F2(i)<1$. "fw" represents a characteristic decay length of $F2(i)$ with respect to density. F2 is exactly 1 at the reference density and no up-scaling or down-scaling occurs at this density. As the density deviates from the reference density, F2 also deviates from 1. fw is used to specify how fast F2 deviates from 1 as the density deviates from the reference density. A default setting of fw=5 roughly means that we start to see the significant effect of density deviation when 5*density deviation >1. The variable s is a scale factor. For example, s may be 2, or 3, or 4. Of course, other values for s may also be used.

In the second distinctive step 304, a dynamic chain-based threshold may be determined using the locally-scaled characteristics described above. In one embodiment, a frame-wide histogram of chain strengths is determined, where the chain strength are the locally-scaled chain strengths. The dynamic chain-based threshold may then be chosen as a percentage point on the histogram such that a percentage of the chains are below the threshold.

The last two steps (206 and 208) are steps common with the second process 200. In the second-to-last step 206, the dynamic chain-based threshold is applied to the candidate edge chains. In the last step 208, those candidate edge chains are removed from the set of edge chains that do not pass the dynamic chain-based threshold applied in the second-to-last step 206. The result is the set of edge chains detected by this edge-detection process 300 for that image. After that step 208, the process 300 loops back to step 106 and image data is input for a next image.

In other embodiments, it may be useful to combine globally dynamic chain-based thresholding and locally dynamic chain-based thresholding in a single image processing technique. This may be accomplished by adding step 202 to the third process 300 and changing step 304 such that it determines the dynamic chain-based threshold using both global characteristic(s) and locally-scaled strengths.

Figure 4:
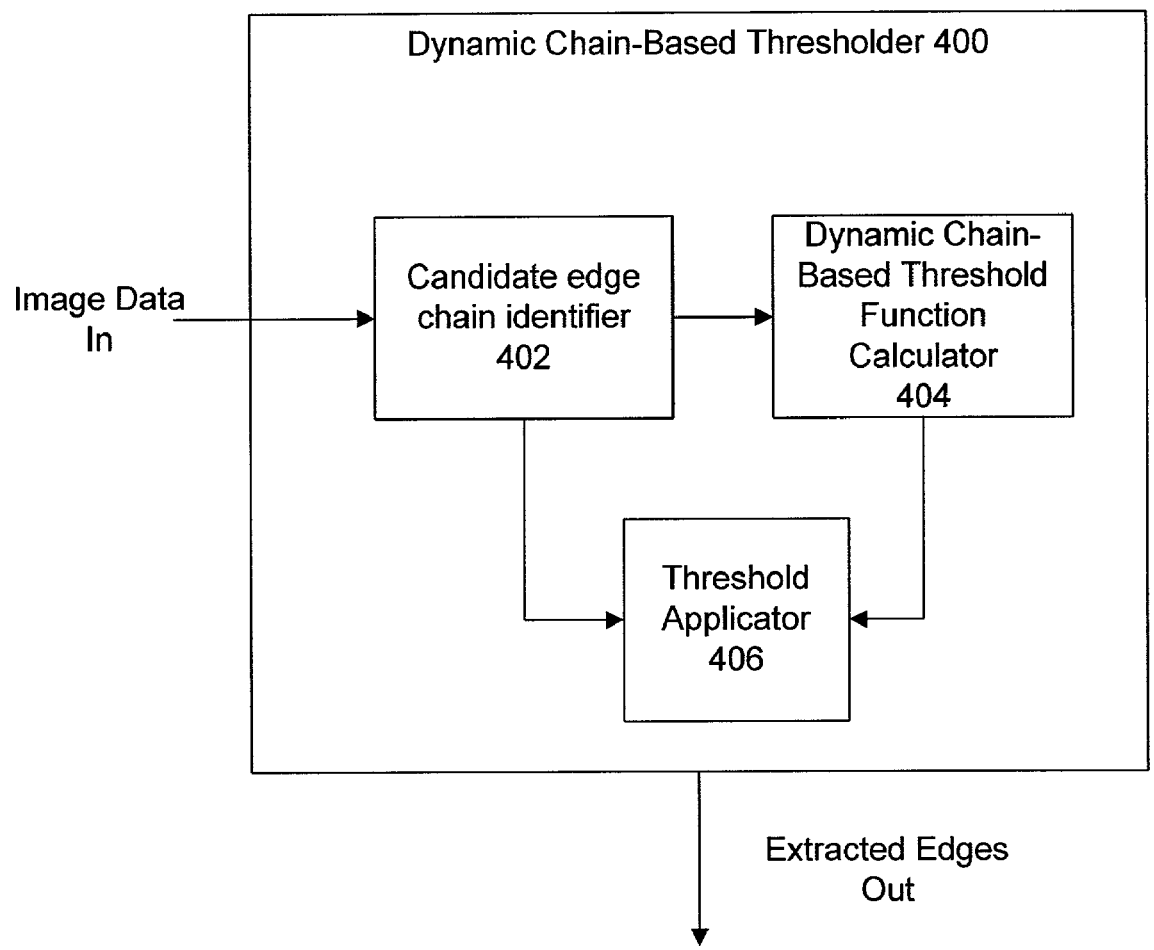
FIG. 4 is a diagram depicting a dynamic chain-based thresholding apparatus in accordance with an embodiment of the invention.

FIG. 4 is a diagram depicting a dynamic chain-based thresholding apparatus 400 in accordance with an embodiment of the invention. The dynamic chain-based thresholder 400 receives image data. The image data is processed by a candidate edge identifier 402 that identifies candidate edge chains in an image. The data on candidate edge chain in the image is input into a dynamic chain-based threshold function calculator 404. The calculator 404 determines a dynamic chain-based threshold function that is dependent on at least one characteristic of the image being processed. Subsequently, a thresholder 406 receives both the dynamic chain-based threshold function and the data on candidate edge chains in the image. The threshold applicator 406 applies the dynamic chain-based threshold function to the candidate edge chains. The output of the thresholder 400 are the extracted edges from the image.

Figure 5:
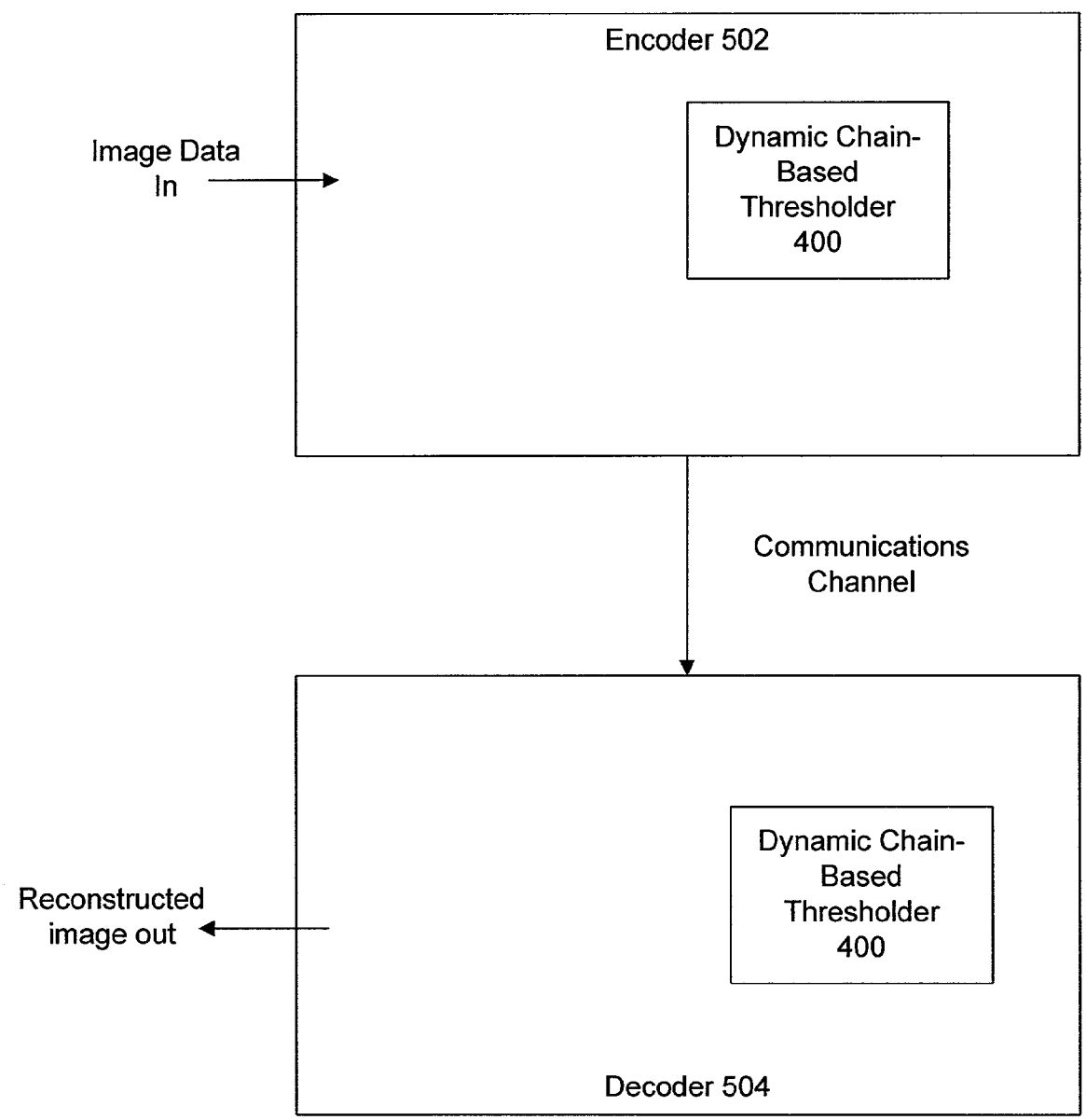
FIG. 5 is a diagram depicting a system in accordance with an embodiment of the invention.

FIG. 5 is a diagram depicting a system 500 in accordance with an embodiment of the invention. The system 500 includes both an encoder 502 and a decoder 504. The encoder 502 may be, for example, incorporated into a video transmitting apparatus. Similarly, the decoder 504 may be incorporated into a video receiving apparatus operable in cooperation with the encoder 502. The encoder 502 may communicate video information by way of a communications channel suitable for transmission of digital data.

As shown in FIG. 5, both the encoder 502 and the decoder 504 may include and utilize the dynamic chain-based thresholder 400. This is advantageous in that, if both encoder and decoder use the same thresholder 400 to extract edges from images, then less information about the image needs to be transmitted. This reduces the bandwidth required to transmit video images while maintaining a visual quality level. Additional discussion of the advantages of such a system is given in related U.S. patent application Ser. No. 09/550,705, filed Apr. 17, 2000 and entitled "Method and Apparatus for Efficient Video Processing," and related U.S. patent application Ser. No. 09/591,438, filed Jun. 9, 2000 and entitled "Method and Apparatus for Digital Image Segmentation," the disclosure of both of which are incorporated herein by reference.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for image processing, the method comprising:
   applying a point-based threshold function to identify candidate edge chains in an image being processed;
   determining a dynamic chain-based threshold function that is dependent on a global characteristic of the image being processed;
   applying the dynamic chain-based threshold function to selectively filter the candidate edge chains; and
   removing from a set of edge chains those candidate edge chains that fail to pass the dynamic chain-based threshold function,
   wherein the global characteristic comprises a global measure of color variation that is calculated over an image.

2. The method of claim 1, wherein the global measure comprises a mean measure of the color variation.

3. The method of 1, wherein the global measure comprises a median measure of the color variation.

4. The method of claim 1, wherein the global measure is calculated over the candidate edge chains within the image.

5. The method of claim 1, wherein the dynamic chain-based threshold function comprises a linear function of the global characteristic.

6. An apparatus for image processing, the apparatus comprising:
   a candidate edge chain identifier for identifying candidate edge chains in an image being processed;
   means for determining a dynamic chain-based threshold function that is dependent on a global characteristic of the image being processed; and
   a threshold applicator for applying the dynamic chain-based threshold function to selectively filter the candidate edge chains,
   wherein the global characteristic comprises a global measure of color variation that is calculated over an image.

7. The apparatus of 6, wherein the global measure comprises a mean measure of the color variation.

8. The apparatus of 6, wherein the global measure comprises a median measure of the color variation.

9. The apparatus of 6, wherein the global measure is calculated over the candidate edge chains within the image.

10. The apparatus of 6, wherein the dynamic chain-based threshold function comprises a linear function of the global characteristic.

11. The apparatus of claim 6, wherein the apparatus comprises a video encoder.

12. The apparatus of claim 11, wherein the video encoder is configured to operate cooperatively with a video decoder, and wherein the video decoder also comprises the edge identifier, the means for determining, and the thresholder.

13. The apparatus of claim 6, wherein the apparatus comprises a video decoder.

14. A method for processing an image, the method comprises:
   determining a dynamic chain-based threshold function that is dependent on a global measure of color variation of the image being processed; and
   applying the dynamic chain-based threshold function to a candidate edge chain.

15. A system for image processing, the system comprising:
   an encoder that includes a candidate edge chain identifier for identifying candidate edge chains in an image being processed, means for calculating a dynamic chain-based threshold function that is dependent on global measure of color variation of the image being processed, and a threshold applicator for applying the dynamic chain-based threshold function to the candidate edge chains; and
   a decoder configured to operate in cooperation with the encoder, wherein the decoder also includes the candidate edge chain identifier, the means for calculating, and the threshold applicator.

* * * * *

UNITED STATES PATENT AND TRADEMARK OFFICE
CERTIFICATE OF CORRECTION

| | |
|---|---|
| PATENT NO. | : 7,133,564 B2 |
| APPLICATION NO. | : 10/087001 |
| DATED | : November 7, 2006 |
| INVENTOR(S) | : Ratner et al. |

It is certified that error appears in the above-identified patent and that said Letters Patent is hereby corrected as shown below:

in claim 3, on column 9, line 35, after "The method of" insert

-- claim -- in claims 7, 8, 9, and 10, on column 10, lines 6-13, after "The apparatus of" insert -- claim --

Signed and Sealed this

Thirtieth Day of January, 2007

JON W. DUDAS
*Director of the United States Patent and Trademark Office*